Patented July 27, 1943

2,325,393

UNITED STATES PATENT OFFICE 2,325,393

MANUFACTURE OF MARGARINE AND COOKING FATS

John Edward Green, Stretford, Manchester, England, assignor to Co-operative Wholesale Society Limited, Manchester, England No Drawing. Application August 21, 1942, Serial No. 455,611. In Great Britain July 31, 1941

13 Claims. (Cl. 99—122)

The present day methods of making margarine and cooking fats, whilst varying among themselves in matters of secondary importance, are all based on a primary scheme which may be epitomised as follows:

1. *Heat treatment.* — The several ingredient oils and fats, some of which may normally be solid, are heated in large jacketed melting tanks in the correct proportions until all are liquid and homogeneously mixed together, and the necessary colouring matter is then added.

2. *Emulsification.*—The melted mixture is run into cylindrical vessels or churns and, whilst hot, is emulsified with water and/or milk. Other ingredients such as salt are sometimes added here.

3. *Cooling.*—The emulsion is run out, before separation of the ingredients can take place, and is caused to pass as a film over cooled drums or cylinders from which the frozen compound is scraped by suitable doctor blades or the like.

4. *Working.*—The product is now worked by suitable mechanical means into a homogeneous mass which is further cooled before being finally packed.

These known methods have inherent disadvantages, from the standpoints both of the quality of the product and of the cost of production. In the first place, from the point of view of the quality of the product, the heating, melting, freezing and super-cooling, of the material, and particularly the high temperatures involved, and also the repeated contact of the material with different metals as it passes from one vessel to another, render it more liable to oxidation or other deterioration, with consequent impairment of the flavour, aroma, vitamin-potency and keeping properties of the product. In the second place, from the point of view of the cost of production, each of the four stages of manufacture requires its own special apparatus, thereby increasing capital costs, and the heating and cooling steps involved call for additional energy, thereby making running costs and maintenance costs higher. Also, known methods do not allow of the product being packed into paper or like containers directly from the machine without super-cooling.

The present invention has for its object a process of manufacture in which the above-stated drawbacks are reduced or eliminated, and in which a more scientific control of the operations is possible.

According to the invention the mixing of the higher-melting-point fats with those of lower-melting-point, and with the other major ingredients, and the emulsification of the mixture, are all carried out without the application to the mixture of any melting or liquefying temperatures during those stages, and also without refrigeration or super-cooling. The process is preferably carried out in a single vessel or apparatus, and without intermediate removal of the material therefrom.

In some cases, as for instance when the fats come from the refinery melted, in tank wagons, the invention may be modified in that some of the higher-melting-point fats, and some of the lower-melting-point fats, are mixed together whilst liquid, and allowed to cool before mixing with the other ingredients. This will produce a solid mixture which is softer than the hardest ingredients, and thereby will put less load on the mixing, emulsifying and homogenising plant.

In its preferred form, the process comprises firstly the bringing of the higher-melting-point fats to a soft and plastic condition by working and mixing, whilst the water and milk (at a suitable temperature) are added; next the addition of the lower-melting-point fats, whilst the working continues at a higher rate; and then the addition of the liquid fats whilst the working continues at a still higher rate. The continued working of the whole mixture results in an emulsion which is stable, of a homogeneous consistency, and capable of being delivered directly into the ultimate paper bags or other suitable containers without any super-cooling. The ingredients do not settle out on cooling, nor does the mass set into a hard and brittle state.

The necessary colourings, flavourings, and vitamin-concentrates, and other minor ingredients may be added at any suitable stage in the process. Preferably, salt and boric acid are added to the water before emulsification, the colouring matter is added to the liquid fats, and the vitamin-concentrates are added to the whole towards the end of the operation.

An examination of the resultant product will show that the ingredients are present throughout the mass homogeneously, in the proportions in which they were brought together initially.

A suitable apparatus for the carrying out of the improved method would consist of a mixing vessel, rotating agitating paddles or beaters therein, means for scraping the inner wall of the vessel, and means for driving the agitators or beaters at different speeds. It is preferred that the vessel be jacketed, to facilitate cleaning, and that it be fitted with or connected to a vacuum apparatus so that the mixing operations may be carried out under a reduced pressure.

The following is an example of the carrying out of the invention for the manufacture of the margarine. The ingredients to be used comprise:—

Higher-melting-point fats:

| | Per cent by weight |
|---|---|
| Hardened whale oil (melting point= 46/48° C.) | 20.00 |
| Hardened ground nut oil (melting point=30/32° C.) | 6.00 |

Lower-melting point fats:

| | |
|---|---|
| Palm oil | 8.00 |
| Coconut oil | 16.50 |
| Palm kernel oil | 16.50 |

Other major ingredients:

| | |
|---|---|
| Liquid ground nut oil | 14.00 |
| Soured milk | 3.00 |
| Water | 13.25 |
| Salt | 2.50 |
| Boric acid | .25 |
| Total | 100.00 | to which may be added minor ingredients as colouring matter, vitamin concentrates and any flavourings, as required.

The plant to be used for this example consists of a vacuum mixing machine, fitted with rotating agitators, which may comprise parallel, inter-geared spindles fitted with suitable blades, the blades of one passing between the blades of the other, and a variable-speed-gearing arrangement, by which the speed of agitation and mixing can be varied, according to requirements during actual manufacture. Revolving doctor blades are also fitted so that the inner side walls of the vessel are kept clear of adhering fats during the processing. The machine is jacketed for steam or water, which can be thermostatically controlled so that, during processing, temperatures are kept within the necessary limits, and also to facilitate cleaning of the machine.

First of all the hardened whale oil and hardened ground nut oil are placed in the machine and are subjected to a slow speed of working and mixing, whilst at the same time the water and milk are fed into the vessel at a suitable temperature, salt and boric acid having been dissolved in the water. Thus the hardened fats are gradually softened and worked into a plastic condition. At this stage, the lower-melting-point fats, i. e., coconut oil, palm kernel oil and palm oil, are added, and the speed of agitation is increased, until the whole is thoroughly mixed, when it will be found that the water and milk have been completely absorbed by the fats.

The liquid ground nut oil (which carries the colouring matter) is now drawn into the machine, with a further rapid increase in the speed of agitation and mixing, under a reduced pressure, until the whole is completely emulsified; further working (during which the vitamin-concentrates and flavourings are added) will now produce a homogeneous consistency so that, on discharge from the machine at a temperature of about 17° C. to 22° C., the mass will set almost immediately without separation of the ingredients, to form a smooth, butter-like texture, having a uniform colour and appearance. The margarine thus produced, without the melting of the fats, and without resource to refrigeration, will be found on examination to have the ingredients evenly distributed throughout the mass, and in the same proportions as those in which they were added during the process.

The oils and fats included in the present invention may be termed substantially neutral glycerides of higher fatty acids. The term "glyceride oil" as used in the claims is intended to include the normally liquid glycerides of such fatty acids.

In modification of the process:

(a) As previously explained, two or more of the fatty ingredients may be mixed together in a preliminary external stage cold or hot, and if hot allowed to cool before use.

(b) The mixing vessel may be heated slightly to soften the fats (but without melting them) thereby reducing the power required for the initial working or mixing.

What I claim is:

1. A method of manufacturing margarine and cooking fats which comprises providing a fat in the solid state, adding aqueous liquid thereto and working said fat and liquid mechanically to form a plastic mass, said fat remaining in the solid state at the end of said working, then adding to said mass a glyceride oil and continuing working said mixture to form a homogeneous mass, and thereafter packaging the product.

2. A method of manufacturing margarine and cooking fats which comprises providing a fat in the solid state, adding aqueous liquid thereto and working said fat and liquid mechanically to form a plastic mass, said fats remaining in the solid state at the end of said working, then adding to said mass a glyceride oil and continuing working said mixture to form a homogeneous mass, and thereafter packaging the product by delivering into a container and allowing the same to set without refrigeration.

3. A method of manufacturing margarine and cooking fats which comprises providing a fat in the solid state, adding aqueous liquid thereto and working said fat and liquid mechanically to form a plastic mass, said fats remaining in the solid state at the end of said working, then adding to said mass a glyceride oil and continuing working said mixture to form a homogeneous mass, and thereafter packaging the product, said product being delivered at about 17°-22° C.

4. A method of manufacturing margarine and cooking fats which comprises providing a fat in the solid state, adding aqueous liquid thereto and working said fat and liquid mechanically to form a plastic mass, said fats remaining in the solid state at the end of said working, then adding to said mass a glyceride oil and continuing working said mixture to form a homogeneous mass, then introducing additional glyceride oil into said mass and working until the whole is emulsified, and thereafter packaging the product.

5. A method of manufacturing margarine and cooking fats which comprises providing a fat in the solid state, adding aqueous liquid thereto and working said fat and liquid mechanically to form a plastic mass, said fats remaining in the solid state at the end of said working, then adding to said mass a glyceride oil and continuing working said mixture to form a homogeneous mass, then introducing additional glyceride oil into said mass and working under reduced pressure until the whole is emulsified, and thereafter packaging the product.

6. A method of manufacturing margarine and cooking fats which comprises providing a fat in the solid state, adding aqueous liquid thereto and working said fat and liquid mechanically at a relatively slow rate of speed to form a plastic mass, said fat remaining in the solid state at the end of said working, then adding to said mass a glyceride oil and continuing working said mixture at a substantially higher rate of speed to form a homogeneous mass, and thereafter packaging the product.

7. A method of manufacturing margarine and cooking fats which comprises providing a fat in the solid state at a temperature below the liquefying point thereof, adding aqueous liquid thereto and working said fat and liquid mechanically to form a plastic mass, said fat remaining in the solid state at the end of said working, then adding to said mass a glyceride oil and continuing working said mixture to form a homogeneous mass, and thereafter packaging the product.

8. A method of manufacturing margarine and cooking fats which comprises providing a mixture of a liquified fat and glyceride oil and allowing the same to cool below the liquefying point of said fat, then adding aqueous liquid thereto and working said fat and liquid mechanically to form a plastic mass, said fat remaining in the solid state at the end of said working, then adding to said mass a glyceride oil and continuing working said mixture to form a homogeneous mass, and thereafter packaging the product.

9. A method of manufacturing margarine and cooking fats which comprises providing a fat in the solid state and working the same, then adding aqueous liquid thereto and working said fat and liquid mechanically to form a plastic mass, said fats remaining in the solid state at the end of said working, then adding to said mass a glyceride oil and continuing working said mixture to form a homogeneous mass, and thereafter packaging the product.

10. A method of manufacturing margarine and cooking fats which comprises providing at fat in the solid state, adding aqueous liquid thereto and working said fat and liquid mechanically to form a plastic mass, said fats remaining in the solid state at the end of said working, then adding to said mass a glyceride oil and continuing working said mixture to form a homogeneous mass, the speed of working being increased in the successive stages thereof, and thereafter packaging the product.

11. A method of manufacturing margarine and cooking fats which comprises providing a fat in the solid state, adding aqueous liquid taken from the class consisting of milk and water thereto and working said fat and liquid mechanically to form a plastic mass, said fat remaining in the solid state at the end of said working, then adding to said mass a glyceride oil and continuing working said mixture to form a homogeneous mass, and thereafter packaging the product.

12. A method of manufacturing margarine and cooking fats which comprises providing about 26 parts by weight of a fat in the solid state, subjecting the same to working at a relatively slow rate of speed, continuing the working at a higher rate of speed whilst feeding about 16 parts of water and milk into said fat, then adding about 41 parts of glyceride oil thereto and continuing the working at a still higher rate of speed until the water and milk are absorbed by said fat and oil, said fat remaining in the solid state at the end of said working, thereafter adding about 14 parts of glyceride oil and continuing the working at a further increased rate of speed under reduced pressure until the whole is completely emulsified, the operations being conducted without the application of heat, discharging the product at a temperature of about 17°–22° C., and allowing the same to set without the application of refrigeration.

13. The process of making margarine or cooking fats wherein first hardened fats are placed in a vessel and worked and mixed at a slow speed agitation whilst water and milk are added, to bring them to a soft and plastic condition; said fats remaining in the solid state at the end of said working, then fats of lower melting point are added and the working continued at a higher rate, next liquid fats are added and the working continued at a still higher rate, and finally the whole is worked to give a homogeneous emulsion of the required consistency.

JOHN EDWARD GREEN.